Nov. 7, 1933.   F. JOHNSON   1,933,855
ANIMAL SNARE
Filed July 29, 1931

INVENTOR:
Frederick Johnson
BY David E. Carlsen
ATTORNEY.

Patented Nov. 7, 1933

1,933,855

UNITED STATES PATENT OFFICE 1,933,855

ANIMAL SNARE

Frederick Johnson, St. Paul, Minn.

Application July 29, 1931. Serial No. 553,811

1 Claim. (Cl. 43—87)

My invention relates to animal catching devices in general and more particularly to a device which is more aptly termed an animal snare. The main object of the invention is to provide a simple, highly efficient and inexpensive snare, the use of which, besides its efficiency, provides for catching animals with no damage to the hide or fur and also brings about the death of an animal caught therein in a short time. For the latter reason the device is desirable from a humane standpoint.

In the accompanying drawing.

Referring to the drawing by reference numerals, corresponding and like parts are referred to in the following description and designated in the several views of the drawing by like reference characters.

Figure 1:
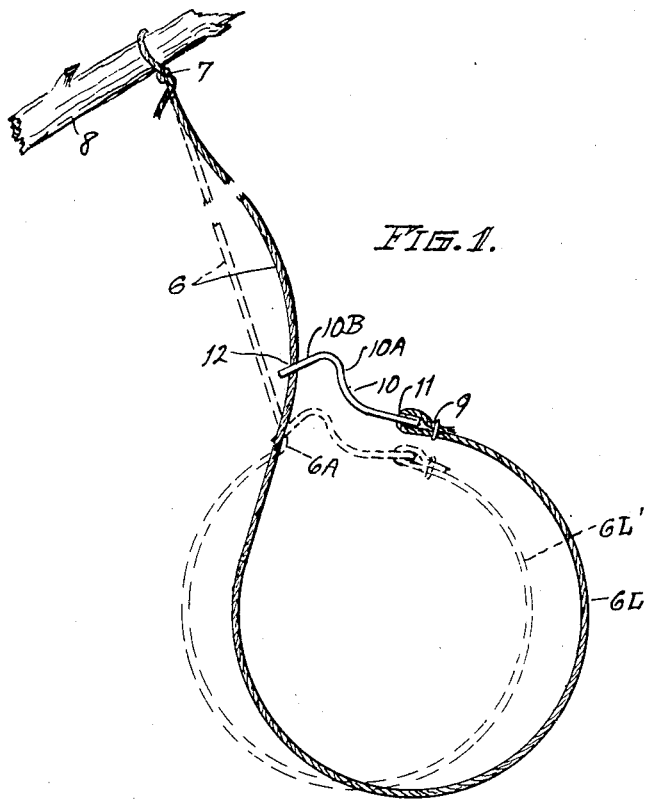
Fig. 1 is an elevation of the snare in operative position.

The numeral 6 designates a length of wire or the like, preferably a woven cord or woven steel wire, of suitable gage, one end of said cord suitably attached as at 7 as to a limb 8 or other fixed element, the cord depending therefrom and its lower part comprising a loop 6L. The other end of the cord is attached as at 9 in an aperture 11 of an elongated metal tightening member 10 which is provided near the end opposite from aperture 11 with another aperture 12 slidably engaged by that part of the cord 6 depending from its fixed end, thus forming the loop 6L.

The loop 6L is of course placed in position in an animal runway transversely the size thereof being determined by the size of animal desired to be trapped, the loop being camouflaged or hidden from view in any suitable manner well known to trappers. The efficiency of my snare lies entirely in the action of member 10. Said member as stated is merely a simple elongated piece of metal, preferably spring steel and comprises a main shank extending forward from aperture 11, thence bent upwardly in an inclined plane as at 10A and from the top of said inclined plane bent forward and down in an inclined plane 10B, said parts 10A and 10B therefore being in an inverted V-shape. The aperture 12 is in the outer part of incline 10B.

When the snare is set as in Fig. 1 the cord 6 extends loosely down through aperture 12, the part 10B of member 10 being in an inclined plane and about at right angles to the cord 6. When an animal comes along its runway and gets its neck or shoulder part within the loop the latter immediately is contracted, cord 6 above member 10 being drawn taut and member 10 riding or sliding down on the cord and the loop being immediately contracted. In Fig. 1, 6L' shows the loop contracted, and assuming that an animal is within said loop and straining thereon it is obvious that the cord 6 where it passes through aperture 12 will be brought to a sharp angle as at 6A and easing up of strain on the loop will cause cord 6 to tend to straighten and simply bind within the aperture against its opposite top and bottom edges. Obviously the loop will not enlarge but on the other hand will contract more as long as the animal exerts a strain or pull in attempting to get free. The more the animal strains to get free the more the loop contracts and chokes it to death.

To release an animal member 10 is simply pressed to a position such that its part 10B is near a position at right angles to the cord 6 above it, at which time said part 10B may be slipped upwardly on the cord, thus enlarging the loop.

Figure 2:
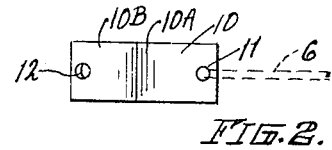
Fig. 2 is a top view and Fig. 3 is a slightly perspective side view of the snare tightening member of the device, in a preferred form.
Figure 3:
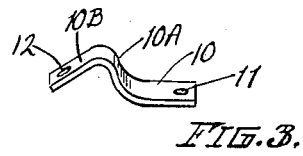
Figure 4:
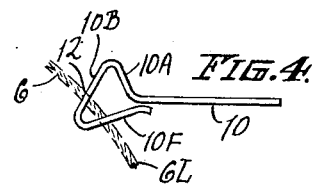
Fig. 4 is a side elevation and Fig. 5 is a bottom view of a modified form of the member shown in Figs. 2 and 3.
Figure 5:
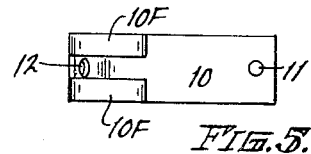

In Figs. 4 and 5 the member 10 is similar to the showing in Figs. 2 and 3 but is provided with two parallel, integral fingers 10F extending from the lower and forward edge of part 10B rearwardly toward the main shank of the member and terminating thereunder. These fingers serve as a guide for the cord 6 which passes downwardly through aperture 12 and between them, said fingers thus preventing knotting or bending of the cord means and actually retaining the loop 6L in a proper plane.

Modifications of my device may be embodied without departing from the scope and spirit of the invention.

I claim:

In an animal snare comprising a length of pliable cord adapted to be attached with one end to a fixed object, the opposite end part of said cord comprising a contractible loop having means slidingly engaging the cord therein; said latter means comprising a metal member having an aperture for the cord to be guided in loosely when the loop is contracted and to frictionally engage said cord when contraction of the loop ceases, said metal member comprising an elongated flat metal piece formed with a straight shank, thence bent in an inverted L-shape, the outermost face of said L-shaped part having the cord aperture, a bifurcated extension from the outermost part of said L-shaped part and extending thence toward the first described straight or shank part of the member to provide a cord guide.

FREDERICK JOHNSON.